United States Patent [19]

de Mollerat du Jeu

[11] Patent Number: 5,214,484
[45] Date of Patent: May 25, 1993

[54] APPARATUS FOR MEASURING METEOROLOGICAL PARAMETERS

[75] Inventor: Christian M. C. de Mollerat du Jeu, Aix en Provence, France

[73] Assignee: Societe Europeenne de Systemes Optiques SESO, Plaisir, France

[21] Appl. No.: 719,803

[22] Filed: Jun. 24, 1991

[30] Foreign Application Priority Data

Jun. 25, 1990 [FR] France ................. 90 07927

[51] Int. Cl.$^5$ .............................. G01P 3/36
[52] U.S. Cl. ........................ 356/28.5; 342/26
[58] Field of Search ............... 356/28.5; 342/26

[56] References Cited

U.S. PATENT DOCUMENTS

| | | |
|---|---|---|
| 3,723,007 | 3/1973 | Leonard . |
| 5,029,999 | 7/1991 | Kremer et al. ............ 356/5 |
| 5,048,951 | 9/1991 | Combe et al. ............ 356/28.5 |
| 5,088,815 | 2/1992 | Garnier et al. ............ 356/28.5 |
| 5,110,217 | 5/1992 | Sweeney ............ 356/43 X |
| 5,123,730 | 6/1992 | Holmes et al. ............ 356/28.5 |

FOREIGN PATENT DOCUMENTS

| | | |
|---|---|---|
| 1069725 | 1/1980 | Canada . |
| 2924490 | 2/1980 | Fed. Rep. of Germany . |
| WO8707018 | 11/1987 | PCT Int'l Appl. . |
| 2215039 | 9/1989 | United Kingdom . |

OTHER PUBLICATIONS

Chester S. Gardner, "Sodium Resonance Fluorescence Lidar Applications in Atmospheric Science and Astronomy", Proceedings of the IEEE, vol. 77, No. 3, Mar. 1989, pp. 408-418 (New York).

*Primary Examiner*—Mark Hellner
*Attorney, Agent, or Firm*—Bell, Seltzer, Park & Gibson

[57] ABSTRACT

Apparatus for measuring meteorological parameters comprises a laser generator transmitting pulse laser signals which are backscattered at least in part by the atmosphere, a receiver including spectrum filter means that are substantially monochromatic, means for adjusting the center wavelength of the transmitted spectrum and of the received wavelength, and means for analyzing the backscattered signal as a function of altitude, as a function of the doppler shifts between the transmitted signals and the backscattered signals, and variations in said signals as a function of the observation direction.

14 Claims, 1 Drawing Sheet

APPARATUS FOR MEASURING METEOROLOGICAL PARAMETERS

The invention relates to apparatus for measuring meteorological parameters such as wind speed and direction, atmospheric temperature at various altitudes, visibility, etc.

BACKGROUND OF THE INVENTION

Light detection and ranging ("lidar") which comprises a laser generator transmitting signals in a given direction and a receiver receiving these signals after partial backscattering by the atmosphere is already in use for measuring some of these parameters. The received signals are then analyzed as a function of time and of wavelength, to determine cloud altitude or wind speed.

Prior "lidar" systems are generally specialized and designed to measure one or a few particular parameters. When it is necessary to know not only the variations as a function of time in the intensity of the received signal but also the doppler shift between the transmitted signal and the received signal, or variations in the spectrum width of the signal, it is necessary either to use a plurality of laser generators, or else a plurality of receivers, and it may be necessary to implement models of other physical parameters in order to obtain the looked-for parameter(s).

This increases the cost of such systems and also gives rise to considerable complexity in signal processing.

A particular object of the invention is to avoid these drawbacks.

An object of the invention is to provide apparatus enabling a large number of meteorological parameters to be measured using a single laser generator in association with a single receiver.

Another object of the invention is to provide apparatus of this type enabling the looked-for parameters to be obtained directly merely by analyzing the signals sequentially.

SUMMARY OF THE INVENTION

To this end, the present invention provides an apparatus for measuring meterological parameters, the apparatus comprising a laser generator transmitter emitting a pulse laser signal, a single receiver whose optical axis is close to the optical axis of the transmitter or substantially coincides therewith and which includes spectrum filter means that are substantially monochromatic and are associated with a photodetector, and means for measuring and analyzing the laser signal backscattered by the atmosphere, wherein the apparatus also comprises means for providing controlled variation of the center wavelength of the spectrum emitted by the laser generator or of the wavelength to which the receiver is tuned, and wherein the means for sequentially analyzing the backscattered signals received by the receiver include means for analyzing variations as a function of time in the intensities of the backscattered signals and means for sequentially analyzing the doppler shift between the transmitted signals and the signals backscattered at a determined altitude.

The apparatus of the invention makes it possible to obtain direct measurements of doppler shift or variation in spectrum width in a signal by varying in controlled manner either the center wavelength at which the laser generator transmits or else the wavelength to which the receiver is tuned.

Advantageously, the apparatus also includes aiming control means serving, in particular, to scan a region of space.

It is thus possible to perform measurements in different directions and to determine meteorological parameters such as wind direction and cloud cover.

In an embodiment of the invention, the spectrum filter means comprise a narrow passband interference filter associated with a Fabry-Perot type interferometer.

The interferometer may include fine adjustment means, e.g. of the piezoelectric type, enabling the wavelength to which the receiver is tuned to be varied very finely.

The laser generator may be of the type that is tunable in wavelength, or it may be constituted by a temperature stabilized laser diode in which case the means for varying the center wavelength of the spectrum transmitted by the generator comprise means for adjusting the temperature applicable to the laser diode.

By sequentially analyzing the backscattered signals, the apparatus of the invention serves to determine variations as a function of altitude in the intensity of the received signal, variations in wavelength between the transmitted spectrum and the received spectrum at each altitude, and variations in intensity and in spectrum in various different directions.

This makes it possible, in particular, to determine the following:

wind speed by analyzing the doppler shift between the transmitted signal and the received signal at a given altitude;

wind direction by measuring wind speed in at least three directions;

temperature at a given altitude by analyzing variations in spectrum width between the transmitted signal and the received signal;

visibility by analyzing variations in the intensity of the backscattered signal;

cloud altitude by analyzing variations in the intensity of the backscattered signal as a function of altitude;

cloud cover by analyzing variations in cloud altitude in various different directions; and the degree of atmospheric turbulence by analyzing variations in the intensity of the received signal over time and/or by analyzing variations in the doppler shift over time.

BRIEF DESCRIPTION OF THE DRAWING

An embodiment of the invention is described by way of example with reference to the accompanying drawing, in which.

DETAILED DESCRIPTION

Figure 1:
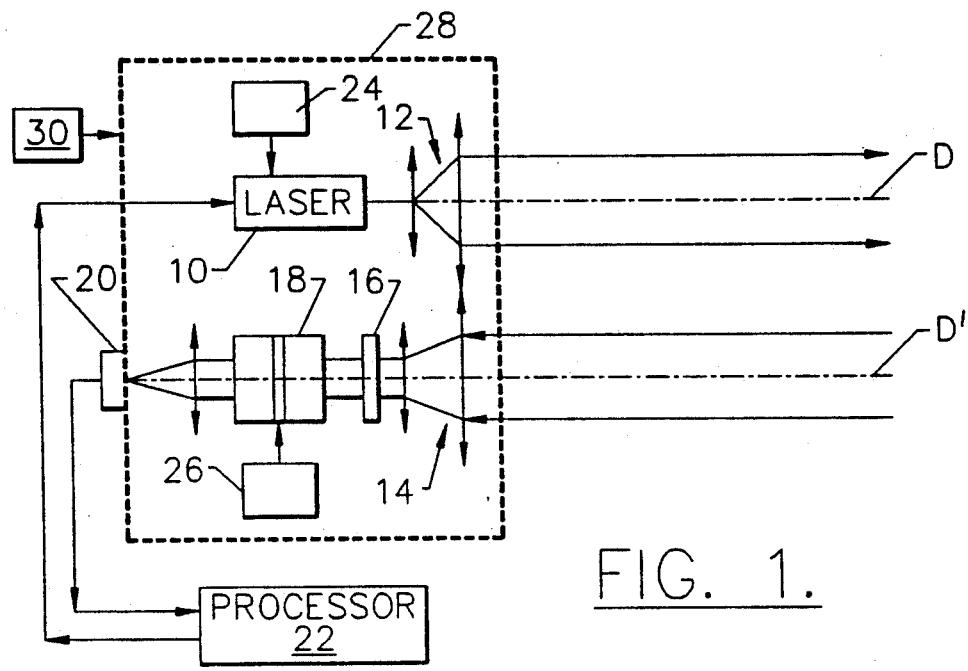
FIG. 1 is a diagram of the measurement apparatus of the invention.

The apparatus of the invention shown diagrammatically in FIG. 1 comprises a laser generator 10 which emits a pulse signal that is transmitted along a direction D by an afocal optical system 12 which serves, in particular, to enlarge the diameter of the beam emitted by the laser generator 10, and to reduce its divergence.

The associated receiver comprises an optical system 14, e.g. a telescope or an afocal optical system, whose optical axis D' is very close to or substantially coincides with the optical axis of the transmitter, followed by a monochronomatic spectrum filter system comprising an interference filter 16 having a very narrow passband, and a Fabry-Perot interferometer 18 centered on a given wavelength. This spectrum filter system 16, 18 is followed by a photodetector 20 whose output is connected to means 22 for analyzing the intensity of the detected signal, and including computer calculation means.

The laser generator 10 may be of the type which is tunable in wavelength or else it may be constituted by a temperature stabilized laser diode, in which case it is associated with means 24 for varying its temperature and acting on the laser diode to obtain a corresponding variation in the center wavelength of the transmitted spectrum.

The Fabry-Perot interferometer 18 may additionally be fitted with fine adjustment means 26, e.g. of the piezoelectric type, suitable for changing the wavelength of the signal transmitted to the photodetector 20.

The means 22 which are essentially constituted by a microcomputer, also serve to control the operation of the laser generator 10, and the operation of the above-described means 24 and 26.

The entire optical system may be mounted on a moving support 28 associated with aiming control means 30 thus making it possible to scan the optical axes D and D' through a region of space.

Figure 2:
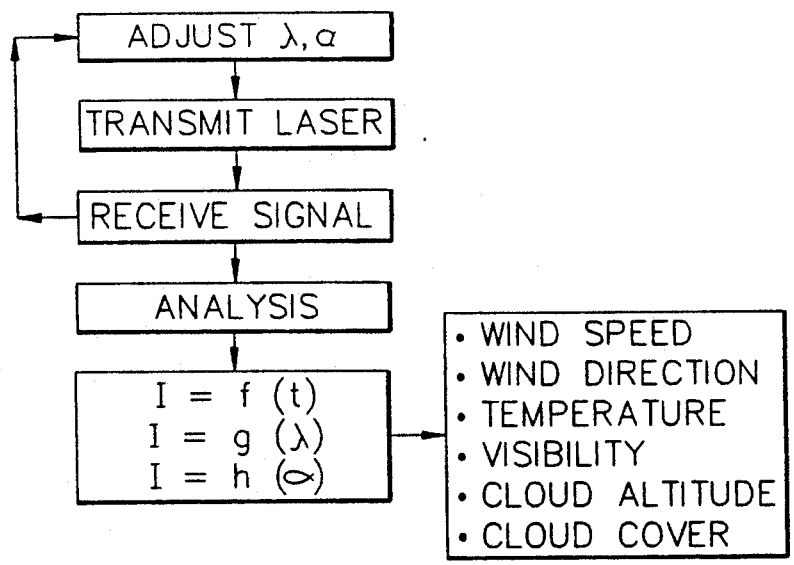
FIG. 2 is a flow chart showing how the apparatus of the invention operates.

The operation of the apparatus of the invention is now described with reference to FIG. 2.

The laser generator 10 transmits a pulse signal in the direction D at a pulse frequency lying in the range about 1 Hz to about 1,000 Hz, with the wavelength spectrum of the pulses being known and centered on a wavelength $\lambda e$ which may be 800 nm or 1,550 nm, for example, when a laser diode is used. The emission power of the generator 10 may be 1 mJ per pulse, for example. When using a solid state laser source, this power may exceed 1 J.

Pulse duration may be 100 ns, for example.

The transmitted laser pulses are backscattered in part by particles in the atmosphere (Rayleigh-Brillouin and/or Mie diffusion) and are picked up by the optical system 14 of the receiver for application to the interference filter 16. This filter has a very narrow passband, of the order of 1 nanometer, and it transmits the signals it receives to the interferometer 18 which is centered, for example, on the mean value of the center wavelength $\lambda e$ on transmission, with an accuracy of about 10 picometers, for example. The output signal from the interferometer 18 is transmitted to the photodetector 20 which may be constituted, for example, by a germanium photodiode or by a photomultiplier tube, depending on the transmitted center wavelength.

The means 22 analyze variation as a function of time in the intensity of the output signal from the detector 20. This intensity variation as a function of time corresponds to variation in the intensity of the signal as a function of altitude.

Thereafter, either the spectrum conditions are varied (by varying the transmission center wavelength or the reception wavelength), or else geometrical conditions are varied (by varying an angle $\alpha$ between the optical axis D, D' and a reference system) and the preceding analyses are performed again.

A meteorological measurement thus comprises analyzing NxMxL laser pulse transmissions, where N is a number of identical pulse transmissions under given geometrical and spectrum conditions, M is the number of successive center wavelength values on transmission or on reception, and L is the number of successive observation directions.

The duration of such a measurement is determined so that the parameters to be measured may be assumed to be constant throughout the duration of the measurement (i.e. fluctuations therein remain below measurement accuracy), with said measurement duration being of the order of one minute or less, for example.

In accordance with the invention, the measurements are relative and they are performed relative to backscattered signals from altitude zero.

For each meteorological measurement, analysis of the intensity of the backscattered signal at different altitudes may be followed by sequential analysis as a function of wavelength and by sequential analysis as a function of observation direction. As shown diagrammatically in FIG. 2, it is thus possible to determine:

wind speed by analyzing the doppler shift between the transmitted signal and the backscattered signal at a given altitude;

wind direction by measuring wind speed in at least three different directions;

temperature at a given altitude by analyzing variations in spectrum width between the transmitted signal and the signal backscattered from said altitude;

visibility by analyzing variations in the intensity of the backscattered spectrum;

cloud altitude by analyzing variations in the intensity of the backscattered signal as a function of altitude;

cloud cover by analyzing cloud altitude variations as a function of observation direction; and the degree of atmospheric turbulence by analyzing variations in the intensity of the received signal as a function of time and/or by analyzing variations in doppler shift as a function of time.

I claim:

1. An apparatus for measuring meteorological parameters comprising, a laser generator transmitter emitting a pulse laser signal along an optical axis, the emitted signal having a spectrum centered on a central wavelength, a single receiver having an optical axis at least close to the optical axis of the transmitter, said single receiver comprising
a substantially monochromatic filter means and a photodetector, said filter means having a narrow passband centered on a central wavelength, means for providing controlled variation of at least one of the central wavelength of the emitted signal and the central wavelength of the filter means in the receiver, means for measuring and sequentially analyzing the laser signals backscattered by the atmosphere comprising, and means for analyzing variations as a function of time in the intensities of the backscattered signals and the doppler shifts between the emitted signals and the backscattered signals.

2. Apparatus according to claim 1, further comprising aiming control means serving to scan a region of space.

3. Apparatus according to claim 1, wherein said filter means is associated with a Fabry-Perot type interferometer.

4. Apparatus according to claim 3, wherein said interferomer includes fine adjustment means.

5. Apparatus according to claim 1, wherein said laser generator is of the type that is tunable in wavelength.

6. Apparatus according to claim 1, wherein said laser generator is a temperature stabilized laser diode, and wherein said means for varying the center wavelength of the transmitted spectrum comprise means for adjusting the temperature applicable to the laser diode.

7. Apparatus according to claim 1, wherein said transmitter includes an afocal optical system for magnifying the diameter of the transmitted beam, and wherein said receiver includes a telescope or an afocal optical system for picking up the backscattered signal.

8. Apparatus according to claim 1, designed to measure wind speed by determining the doppler shift between the spectrum transmitted by said laser generator and the spectrum backscattered from a determined altitude.

9. Apparatus according to claim 8, designed to determine wind direction by measuring wind speed in at least three different directions.

10. Apparatus according to claim 1, designed to measure atmospheric temperature by analyzing variations in the spectrum width of the signals backscattered from determined altitudes.

11. Apparatus according to claim 1, designed to determine visibility by analyzing variations in the intensities of the spectra of the backscattered signals.

12. Apparatus according to claim 1, designed to measure the altitude of clouds by analyzing variations in the intensities of the backscattered signals as a function of altitude.

13. Apparatus according to claim 12, designed to determine cloud cover by analyzing variations in cloud altitude as a function of the aiming direction of the apparatus.

14. Apparatus according to claim 8, designed to determine the degree of atmospheric turbulence.

* * * * *